US011873791B2

(12) United States Patent
Glud et al.

(10) Patent No.: US 11,873,791 B2
(45) Date of Patent: Jan. 16, 2024

(54) MATERIAL CORE FOR WIND TURBINE BLADE AND METHOD FOR MANUFACTURING THE SAME

(71) Applicant: Envision Energy CO., LTD, Jiangsu (CN)

(72) Inventors: Jens Glud, Billund (DK); Giancarlo Girolomini, Coriano (IT); Lars Christian Terndrup Overgaard, Aalborg (DK)

(73) Assignee: Envision Energy CO., LTD, Jiangsu (CN)

( * ) Notice: Subject to any disclaimer, the term of this patent is extended or adjusted under 35 U.S.C. 154(b) by 0 days.

(21) Appl. No.: 17/776,231

(22) PCT Filed: Nov. 28, 2019

(86) PCT No.: PCT/CN2019/121431
§ 371 (c)(1),
(2) Date: May 12, 2022

(87) PCT Pub. No.: WO2021/102767
PCT Pub. Date: Jun. 3, 2021

(65) Prior Publication Data
US 2022/0389903 A1    Dec. 8, 2022

(51) Int. Cl.
*F03D 1/00* (2006.01)
*F03D 1/06* (2006.01)
(52) U.S. Cl.
CPC ........ *F03D 1/0675* (2013.01); *F05B 2230/10* (2013.01)

(58) Field of Classification Search
CPC ...... F03D 1/065; F03D 1/0675; F03D 1/0633; F03D 1/0683; F03D 1/0641
See application file for complete search history.

(56) References Cited

U.S. PATENT DOCUMENTS 3,841,958 A * 10/1974 Delorme ............... B32B 25/045
428/117
5,834,082 A * 11/1998 Day ........................ E04C 2/296
428/56

(Continued)

FOREIGN PATENT DOCUMENTS

CN     2714283      8/2005
CN    104421110     3/2015
(Continued)

OTHER PUBLICATIONS

"Office Action of China Counterpart Application", dated Apr. 15, 2022, pp. 1-6.
(Continued)

*Primary Examiner* — Matthew T Largi
(74) *Attorney, Agent, or Firm* — JCIPRNET

(57) ABSTRACT

A material core (100) for wind turbine blade, comprising: a core body (101); a first groove (102) extending from a first side (104) of the core body (101), in a first direction (106), into a depth d1 in the core body (101); and a second groove (103) extending from a second side (105) of the core body (101) facing away from the first side (104), in a direction opposite to the first direction (106), into a depth d2 in the core body (101), wherein the second groove (103) is parallel to the first groove (102), and wherein: d2=t−d1+x, 1 mm≤x<d1, wherein t is a thickness of the core body (101), and wherein a distance between the first and second grooves is o, wherein: 1 mm≤o≤5 mm.

16 Claims, 6 Drawing Sheets

(56) References Cited

U.S. PATENT DOCUMENTS

| | | | | |
|---|---|---|---|---|
| 8,440,120 | B2 | 5/2013 | Mikkelsen et al. | |
| 2004/0128948 | A1* | 7/2004 | Killen | B32B 27/302 52/782.1 |
| 2010/0189973 | A1* | 7/2010 | Mikkelsen | B05B 3/1092 156/245 |
| 2012/0107553 | A1* | 5/2012 | Appleton | F03D 1/065 428/411.1 |
| 2013/0280087 | A1* | 10/2013 | Appleton | B29C 70/603 416/241 A |
| 2013/0294925 | A1* | 11/2013 | Appleton | H01Q 15/148 416/241 R |
| 2018/0015703 | A1* | 1/2018 | Fossat | B32B 5/26 |
| 2020/0331179 | A1* | 10/2020 | Stein | B29C 44/50 |
| 2022/0325692 | A1* | 10/2022 | Mukherjee | B29C 70/443 |

FOREIGN PATENT DOCUMENTS

| | | |
|---|---|---|
| CN | 206144719 | 5/2017 |
| CN | 107718598 | 2/2018 |
| CN | 207879526 | 9/2018 |
| EP | 2160287 | 3/2010 |

OTHER PUBLICATIONS

"International Search Report (Form PCT/ISA/210) of PCT/CN2019/121431," dated Jul. 29, 2020, with English translation thereof, pp. 1-2.

Office Action of India Counterpart Application, dated Nov. 14, 2022, pp. 1-5.

Office Action of Saudi Arabia Counterpart Application, with English translation thereof, dated Dec. 14, 2022, pp. 1-10.

Office Action of Brazilian Counterpart Application, dated Jun. 9, 2023, pp. 1-4.

Office Action of Australian Counterpart Application, dated Aug. 14, 2023, pp. 1-5.

* cited by examiner

MATERIAL CORE FOR WIND TURBINE BLADE AND METHOD FOR MANUFACTURING THE SAME

CROSS-REFERENCE TO RELATED APPLICATION

This application is a 371 of international application of PCT application serial no. PCT/CN2019/121431, filed on Nov. 28, 2019. The entirety of the above mentioned patent application is hereby incorporated by reference herein and made a part of this specification.

TECHNICAL FIELD

The present invention relates generally to the field of wind turbine. More particularly, the invention relates to a material core for wind turbine blade and a method for manufacturing such material core. Furthermore, the present invention relates to a wind turbine blade and a wind turbine.

BACKGROUND

In recent years, the field of clean energy has shown a rapid development trend. As a new type of energy, clean energy has the advantages of wide distribution, high renewability, and low environmental pollution compared with traditional fossil fuels. As a representative of clean energy, the usage of wind turbines keeps growing.

The blades of wind turbines are important components of wind turbines to capture wind energy, and their quality is directly related to equipment safety and power generation efficiency. An important factor in determining the quality of the blade is the quality of the building block that forms the blade. A sandwich panel, in turn, is the main component of the blade building block. The sandwich panel consists of a light material called "core material" (or simply "core") which is sandwiched between heavier but thin glass/carbon fiber reinforced polymer laminates. Under normal circumstances, the core should have a good ability to be draped on to a blade mold surface (so-called "drapability"), for example a double curved (convex or concave) surface, in order to form the airfoil shape of the wind turbine blade. A good drapability may contribute to a high quality blade surface, and thus to a better pneumatic performance and higher power generation efficiency as well as to a higher operating safety factor.

In order to improve the drapability of the core material, a grid of grooves (or scores) is cut in the core material. In the prior art, the following types of grooves have been proposed:
  Shallow groove, cut on one or both sides, lengthwise and/or crosswise, which may be combined with 1-3 mm square grid perforations.
  Saw-cut pattern (see FIG. 1A), cut on one side of the core, lengthwise and crosswise. The small blocks are held together, for example, by a lightweight fiberglass scrim. Cuts may be razor cut (no removal of material) to minimize resin absorption.
  So-called "Flexi-cut" (see FIG. 1B), a cut pattern in which both sides of the core are cut in both directions to a depth greater than 50% of the core thickness, thus creating a "flexible" core sheet. Cuts may be razor cut (no removal of material) to minimize resin absorption. The cuts on both sides are always at equidistance to each other.
  Cut in one direction only, for bend in a single curvature only. Cuts may be razor cut (no removal of material) to minimize resin absorption.

However, the existing solutions for grooves are sensitive to manufacturing variations and tolerances, that is, the properties of the manufactured cores may be greatly influenced by the manufacturing variations and tolerances, which places very high demands on the manufacturing process, thereby raising the total blade manufacturing costs.

BRIEF SUMMARY

Starting from the prior art, it is an object of the present invention to provide a material core for wind turbine blade and a method for manufacturing such material core, with which the drapability of the core may be enhanced while reducing the sensitivity of the properties of the manufactured cores to manufacturing variations, meanwhile additional benefits such as a strength and stiffness optimum of the infused panel may be achieved.

In a first aspect of the invention, this object is solved by a material core for wind turbine blade, the material core comprising:
  a core body;
  a first groove extending from a first side of the core body, in a first direction, into a depth $d_1$ in the core body; and
  a second groove extending from a second side of the core body facing away from the first side, in a direction opposite to the first direction, into a depth $d_2$ in the core body, wherein the second groove is parallel to the first groove, and wherein:

$d_2 = t - d_1 + x,$ $1 \text{ mm} \le x < d_1,$ wherein t is a thickness of the core body, and wherein a distance between the first and second grooves is o, wherein:

$1 \text{ mm} \le o \le 5 \text{ mm}.$

It should be noted that, in the present invention, the term "groove" may encompass various forms of notches and slits without mentioning their width, that is, the groove used herein may have a large or small width or no width at all (as used herein, the wording "no width" means that the width is so small that it may be negligible compared to its other dimensions). For example, in case of a groove with a width, the material in the groove may have been removed, while in case of a groove with without a width, the groove may be a slit (or score) without any or substantial material being removed.

It should also be noted that, the first direction and the second direction may be construed in ration to each side of the core. For example, the first direction and the second direction may be oriented from the top surface to the bottom surface of the core, or on the contrary. And, the first direction and the second direction may be or may not be perpendicular to the surface of the core. In a preferred embodiment, the first direction and the second direction is perpendicular to the top and bottom surface of the core.

In an embodiment of the invention, the core body comprises a plurality of the first grooves and a plurality of the second grooves, wherein the distance o between the first and second grooves is smaller than a distance between adjacent two of the first grooves. In this way, the drapability of the material core may be further improved by disposing desired number of the first and second grooves. The numbers of the first and second grooves may vary according to specific use cases. In a preferred embodiment, the distance o between the first and second grooves is ⅕, ⅒, 1/20 or 1/100 of the distance between adjacent two of the first grooves if these adjacent first grooves are parallel to each other.

In another embodiment of the invention, the material core comprises a plurality of pairs of the first and second grooves, wherein the plurality of pairs of the first and second grooves form a pattern on one or more sides of the core body. For example, the pattern may comprise one or more rectangles, squares, triangles or hexagons. The triangles may be equilateral triangles or other triangles, and the hexagons may be regular hexagons or other hexagons. The pattern may be formed on top side, bottom side or lateral side of the core body.

In another embodiment of the invention, the core body further comprises:
- a third groove extending from the first side, in a second direction at a first angle $\alpha$ to the first direction, into depth $d_1$ in the core body, wherein the third groove is at a second angle $\beta$ to the first groove; and
- a fourth groove extending from the second side, in a direction opposite to the second direction, into depth $d_2$ in the core body, wherein the fourth groove is parallel to the third groove, wherein a distance between the third and fourth grooves is o.

By doing this, the drapability of the material core may be further improved by improving the drapability of the material core in another direction. In a preferred embodiment, the first angle $\alpha$ is 0° and the second angle $\beta$ is 90°, so that the grooves may form a square or rectangular grid on one or more sides of the core. In other embodiments, the second direction may be different from the first direction, i.e. the first angle $\alpha$ is non-zero, and the third and fourth grooves are not perpendicular to but inclined to or at an oblique angle to the first and second grooves. In this way, a better drapability may be achieved in a desired direction.

In yet another embodiment, the core body comprises a plurality of the third grooves and a plurality of the fourth grooves, wherein the distance o between the third and fourth grooves is smaller than a distance between adjacent two of the first grooves. By doing this, the drapability of the material core may be further improved by disposing desired number of the third and fourth grooves. The numbers of the third and fourth grooves may vary according to specific use cases. In a preferred embodiment, the distance o between the third and fourth grooves is ⅕, ⅒, 1/20 or 1/100 of the distance between adjacent two of the third grooves if these adjacent third grooves are parallel to each other.

In an embodiment of the invention, the first groove and/or the second groove has a width such that the groove is able to guide resin flow. In this way, the infusion between the core and the laminates may be facilitated, for example, by better wetting the core with the infusion material, i.e. the resin.

In another embodiment of the invention, the core body has a shape of cuboid. It should be noted that, in other embodiments, in light of the teachings of the present invention, core of other shape may be conceivable, such as cubic shape, round shape and etc.

In yet another embodiment of the invention, the core body is made from a material selected from a group comprising: Balsa wood, *Paulownia* wood, PET foam, PVC foam, SAN foam, PMI foam, PEI foam, PS foam and PU foam. In other embodiments, in light of the teachings of the present invention, cores made from other material may be conceivable, such as other synthetic foam materials.

In a second aspect of the invention, the aforementioned object is solved by a sandwich panel for wind turbine blade, comprising:
- a first laminate and a second laminate; and
- the material core according to the invention disposed between the first and second laminates.

In an embodiment of the invention, the first and/or second laminates comprise glass or carbon fiber reinforced polymer. In other embodiments, in light of the teachings of the present invention, laminates made from other material may be conceivable, such as laminates containing other reinforcing materials such as polymer fiber.

In a third aspect of the invention, the aforementioned object is solved by a method for manufacturing a material core for wind turbine blade, comprising
- cutting a core body of the material core to form a first groove which extends from a first side of the core body, in a first direction, into a depth $d_1$ in the core body; and
- cutting the core body to form a second groove which extends from a second side of the core body facing away from the first side, in a direction opposite to the first direction, into a depth $d_2$ in the core body, wherein the second groove is parallel to the first groove, and wherein:

$$d_2 = t - d_1 + x,$$

$$1 \text{ mm} \leq x < d_1,$$

wherein t is a thickness of the core body, and wherein a distance between the first and second grooves is o, wherein:

$$1 \text{ mm} \leq o \leq 5 \text{ mm}.$$

It should be noted that, in the present invention, the term "cutting" or "cut" may encompass various types of cutting, such as laser cutting, mechanical cutting, heat cutting and etc. It may also be understood that the cutting may be performed in various directions and ways so long as the manufactured core has the desired grooves. For example, the cutting may be performed on the top or bottom side in a vertical direction, or the cutting may be performed on the lateral side in a horizontal direction.

In an embodiment of the invention, the method further comprises:
- cutting the core body to form a third groove extending from the first side, in the first direction, into depth $d_1$ in the core body, wherein the third groove is perpendicular to the first groove; and
- cutting the core body to form a fourth groove extending from the second side, in a direction opposite to the first direction, into depth $d_2$ in the core body, wherein the second groove is parallel to the third groove, wherein a distance between the third and fourth grooves is o.

By doing this, a square or rectangular grid of grooves may be formed on one or more sides of the core, so that the drapability may be enhanced.

In another embodiment of the invention, cutting the core body further comprising: removing or not removing material from the core body. In case of removing material, the grooves may have a larger width, so that the infusion may be facilitated, while in case of not removing material, the cutting may be a razor cut, and the grooves may be slits, so that the absorption of resin by the core may be minimized and the cutting may be simpler or cheaper.

Furthermore, the present invention also relates to a wind turbine blade and a wind turbine adopting the material core according to the present invention.

The present invention possesses at least the following beneficial technical effects: by re-designing the grooves, the present invention may substantially lower the sensitivity of the properties of the manufactured cores to manufacturing variations and tolerances while achieving the same or even better drapability, meanwhile additional benefits such as a reaching a strength and stiffness optimum of the infused panel may be achieved. Specifically, by arranging a second groove that is started from the other side than the first groove, the core will have higher drapability to double curved surfaces, that is, the core may be curved in both directions; by shortening the depth of the second groove and disposing the second groove closer to the first groove, the sensitivity of the properties of the manufactured cores to manufacturing variations and tolerances may be greatly reduced or even eliminated, so that a higher quality of the manufactured cores may be achieved, and the strength and the stiffness of the infused panel may also be enhanced. This is based on the insight of the inventor that: the main reason of influence of variations and tolerances on the core properties lies in that, the parameter r, i.e. the distance between an end of the first groove and the bottom side of the core body, is difficult to be precisely controlled during the manufacturing process (or it needs much higher costs to control r), thus leading to varying performances of the produced cores. At the same time, by means of researches, the inventor has surprisingly found out that, by arranging the second groove close enough to the first groove (2 mm≤o≤5 mm, where o is the distance between the first and second grooves) and properly determining the depth $d_2$ of the second groove in relation to r (1 mm+r≤$d_2$<t, where t is a vertical thickness of the core body), the influence of varying parameter r on the core property may be minimized or even eliminated, so that the sensitivity of the core properties to variations and tolerances may be substantially reduced or even eliminated, while the strength and the stiffness of the infused panel are unexpectedly also be enhanced.

It is to be understood that both the foregoing brief summary and the following detailed description describe various embodiments and are intended to provide an overview or details for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable those skilled in the art to make and use the present disclosure.

DETAILED DESCRIPTION

Figure 1A:
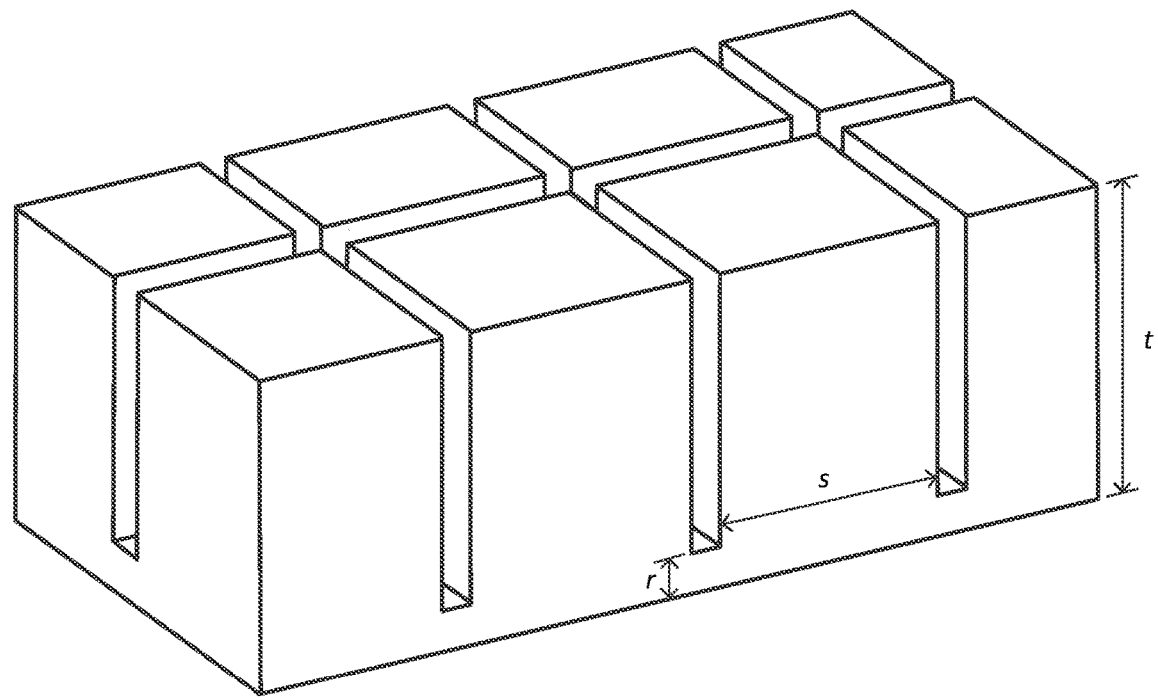
FIGS. 1A and 1B are schematic views showing the technical solutions for blade material cores according to the prior art.
Figure 1B:
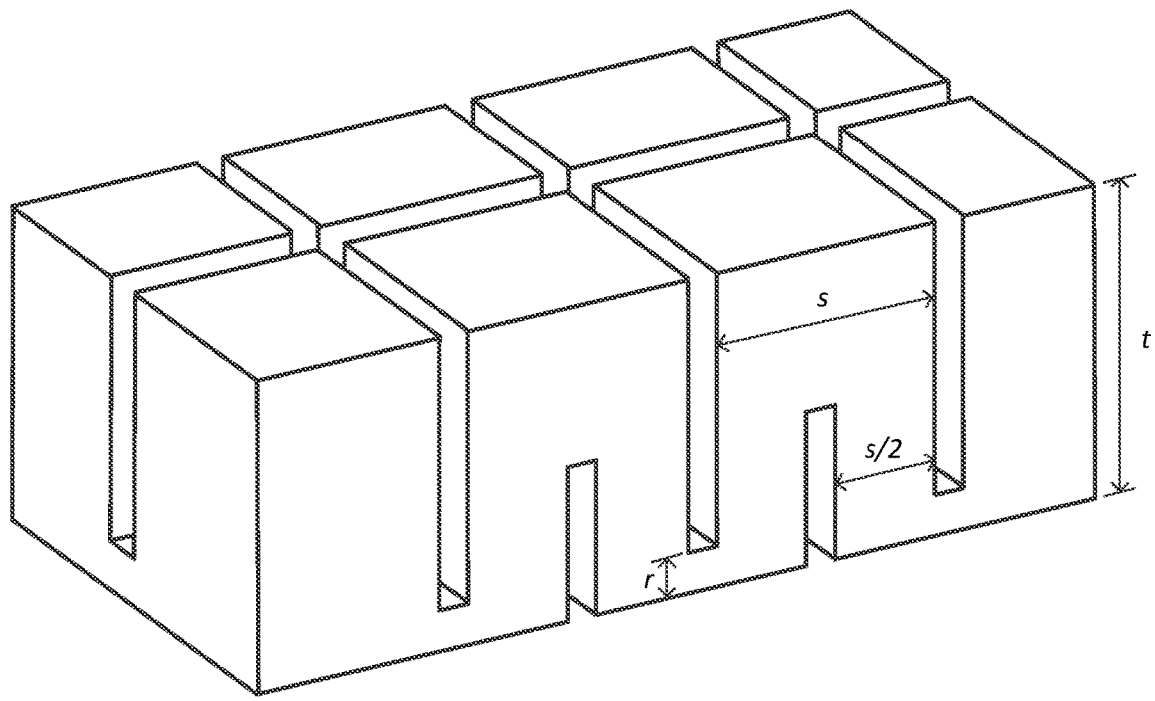

In the following description, for the purposes of explanation, numerous specific details are set forth in order to provide a thorough understanding of the embodiments of the invention described below. It will be apparent, however, to those skilled in the art that the embodiments of the invention may be practiced without some of these specific details. In other instances, well-known structures and devices are shown in block diagram form to avoid obscuring the underlying principles of the embodiments of the invention.

While the embodiments disclosed herein have been set forth for the purpose of illustration, the foregoing description should not be deemed to be a limitation on the scope of the disclosure or the appended claims. Accordingly, various modifications, adaptations, and alternatives may occur to those skilled in the art without departing from the spirit and scope of the present disclosure or the appended claims.

It should be noted that the various components in the drawings may be shown exaggerated for illustration and not necessarily to scale. In the drawings, the same or functionally identical components are provided with the same reference numerals.

In the present invention, the terms "arranged/disposed above", "arranged/disposed on" and "arranged/disposed over" do not exclude the existence of an intermediate component between two components unless otherwise specified. In addition, "arranged/disposed on, over, or above" means only the relative positional relationship between the two components, and under certain circumstances, such as after reversing the direction of the product, it can also be converted to "arranged under, underneath or below", and vice versa.

In the present invention, the embodiments are merely intended to illustrate the solution of the present invention and should not be construed as limiting.

In the present invention, the articles "a" and "an" used before a component are not intended to exclude a plurality of such components.

It should also be noted that in the embodiments of the present invention, only a part of the components or components may be shown for the sake of clarity and simplicity. However, those skilled in the art will appreciate that the required component or components may be added as needed in light of the teachings of the present invention.

It should also be noted that within the scope of the present invention, the terms "same as", "equal to" and the like do not mean that the values are absolutely equal, but rather allow a certain reasonable variation or tolerance, that is, the terms also encompass "substantially the same as", "substantially equal to" and etc. Similarly, in the present invention, the terms "perpendicular to", "parallel to", and the like denoting directions also encompass the meaning of "substantially perpendicular to", "substantially parallel to" and etc.

Additionally, the numbering of the steps of the various methods of the present invention does not limit the order of execution of the method steps. The method steps can be performed in a different order unless otherwise indicated.

The present invention is based on the insight of the inventor that, the existing technical solutions for blade material core have at least two main limitations. Firstly, some blade material cores (or simply "material core" or "core") in the prior art have grooves on only one side, therefore, at saddle points (concave in one direction and convex in the other direction) of the mold surface, the core or the panel might be broken in lengthwise or crosswise direction in order to drape the core material to the mold surface, thus leading to a damaged core or panel. Secondly, the existing technical solutions for material core are sensitive to manufacturing variations and tolerances. The inventor has surprisingly found out that the main reason of influence of variations and tolerances on the core properties lies in that the parameter r, i.e. the distance between an end of the first groove and the bottom side of the core body, is difficult to be precisely controlled during the manufacturing process (or it needs much higher costs to control r), thus leading to varying performances of the produced cores. For example, in case of greatly varying parameter r, the properties of the material core, such as drapability, durability, stiffness and etc. also vary greatly, thus increasing the possibility of lower quality or lower yield rate of material cores. At the same time, by means of researches, the inventor has also found out that, by arranging the second groove close enough to the first groove (1 mm≤o≤5 mm, where o is the distance between the first and second grooves) and properly determining the depth $d_2$ of the second groove in relation to r (1 mm+r≤$d_2$<t, where t is a vertical thickness of the core body), the influence of varying parameter r on the core property may be minimized or even eliminated, so that the sensitivity of the core properties to variations and tolerances may be substantially reduced or even eliminated, while the strength and the stiffness of the infused panel is unexpectedly also be enhanced.

In the following, the invention will be further set forth with reference to the drawings in conjunction with embodiments.

Figure 2A:
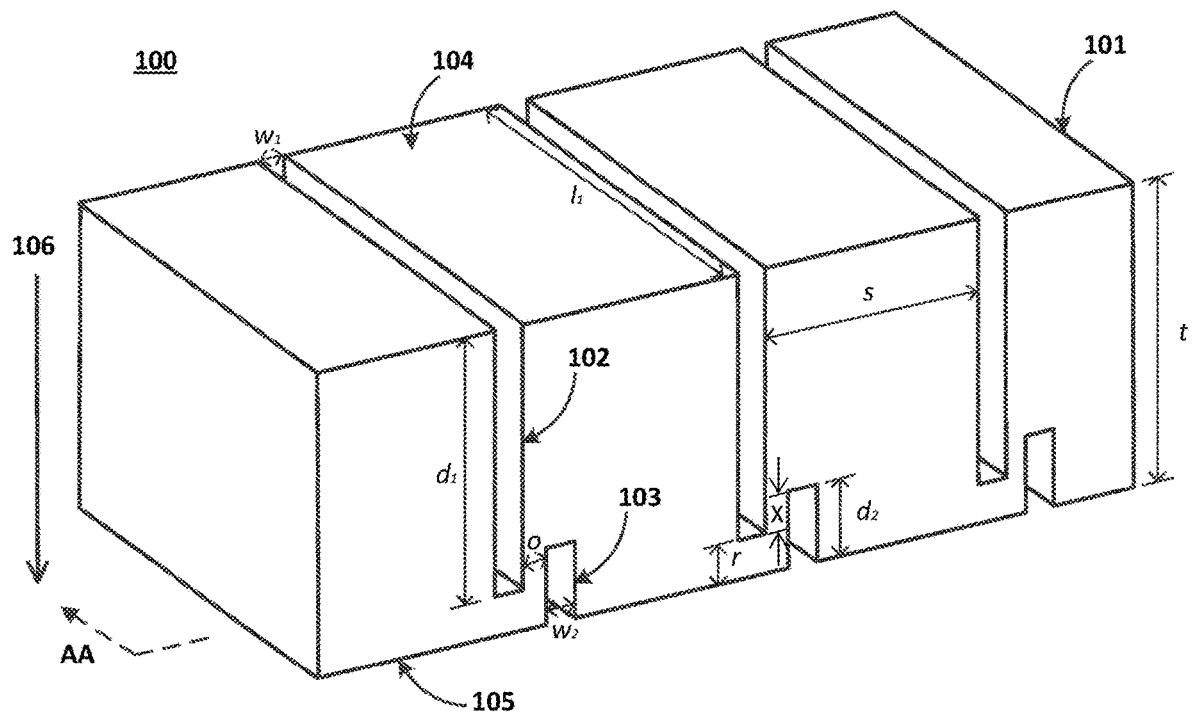
FIGS. 2A-2B illustrate a perspective view and a sectional view of a first exemplary embodiment of the material core according to the present invention.
Figure 2B:
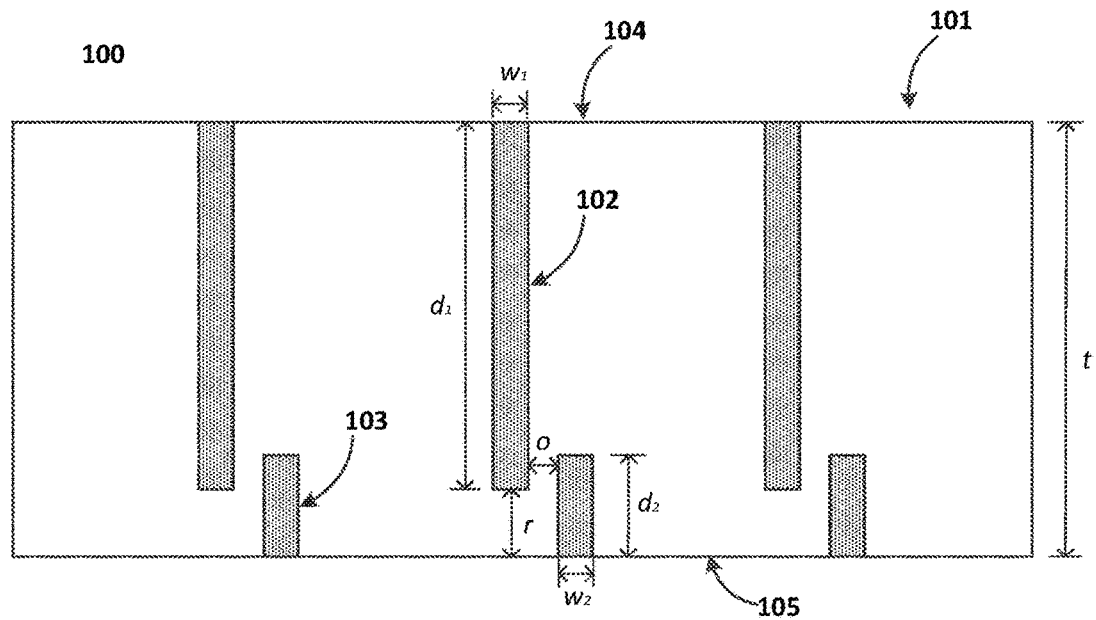

FIGS. 2A-2B illustrate a perspective view and a sectional view (along direction AA) of a first exemplary embodiment of the material core according to the present invention.

As shown in FIGS. 2A-2B, in the first embodiment, the material core 100 for wind turbine blade according to the present invention comprises the following components:

a core body 101, which may be made from a Balsa wood, or synthetic foam such as PET foam, PVC foam, and PU foam. In this embodiment, the core body 101 is shown as cuboid shape, but in other embodiments, in light of the teachings of the invention, core of other shape may be conceivable, such as cubic shape, flat disc shape and etc. The core body 101 has a first side 104 (or a "top face") and a second side 105 (or a "bottom face") facing away from the first side 104.

first grooves 102 extending from the first side 104, i.e. the top face, of the core body 101, in a first direction 106, into a depth $d_1$ in the core body 101. That is, the first grooves 102 start from the first side 104 and ends at a depth $d_1$ into the core body 101. In this example, three first grooves 102 are disposed in the core body 101, but in other examples, other numbers (such as one, four, five or twenty) of first grooves 102 may be disposed in each core. Adjacent first grooves 102 may be spaced from each other by a same distance or different distances. The first grooves 102 has a length $l_1$ and a width $w_1$, which may be the same or different among all first grooves 102. In a preferred embodiment, the length $l_1$ and the width $w_1$ are the same among all first grooves 102 in the material core 100. The term "depth of a groove" refers to the distance between the starting point and the ending point of the groove in the extending direction of the groove. The term "length of a groove" refers to the larger dimension of the two dimensions of the groove perpendicular to the depth of the groove. The length $l_1$ of the first grooves 102 may extend over the entire width of the core body 101, that is, extend through the core body 101, or it may extend merely partially over the width of the core body 101. The term "width of a groove" refers to the smaller dimension of the two dimensions of the groove perpendicular to the depth of the groove, or the dimension perpendicular to the plane defined by the straight line along the depth of the groove and the straight line along the length of the groove. The width $w_1$ of the first grooves 102 may be a larger width or very small width (the width may be so small that it may be negligible compared to its other dimensions). For example, in case of a groove with a larger width, the material in the groove may have been removed, so that the infusion will be facilitated by guiding the infusion flow, i.e. the resin flow in the grooves, while in case of a groove with a very small width, the groove may be a slit (or score or a razor cut) without any or substantial material being removed, so that the absorption of the infusion material, i.e. the resin (for example epoxy resin) by the core may be minimized.

second grooves 103 extending from the second side 105, i.e. the bottom face, of the core body 101 facing away from the first side 104, in a direction opposite to the first direction 106, into a depth $d_2$ in the core body 101. That is, the second grooves 103 start from the second side 105 and ends at a depth $d_2$ into the core body 101. The second grooves 103 are parallel to the first grooves 102. In this embodiment, this means that, the direction along the length $l_2$ (not shown) of the second grooves 103 is parallel to the direction along the length $l_1$ of the first grooves 102. The length $l_2$ of the second grooves 103 may extend over the entire width of the core body 101, that is, extend through the core body 101, or it may extend merely partially over the width of the core body 101. The width $w_2$ of the second grooves 103 may be a larger width or very small width (the width may be so small that it may be negligible compared to its other dimensions). In this example, three second grooves 103 are disposed in the core body 101, but in other examples, other numbers (such as one, four, five or twenty) of second grooves 103 may be disposed in each core body. Adjacent second grooves 103 may be spaced from each other by a same distance or different distances. The second grooves 103 has a length $l_2$ (not shown) and a width $w_2$, which may be the same or different among all second grooves 103, and the length $l_2$ and the width $w_2$ of the second grooves 103 may be the same as or different from that of the first grooves 102. In a preferred embodiment, the length $l_2$ and the width $w_2$ of the second grooves 103 are the same among all second grooves 103 in the material core 100, and the same as that of the first grooves 102. The depth $d_2$ of the second grooves 103 and the distance o between the first and second grooves 102 and 130 satisfy the following formula:

$$d_2 = r + x, \tag{1}$$

$$r = t - d_1, \tag{2}$$

$$1 \text{ mm} \leq x < d_1, \tag{3}$$

wherein r is the distance between an end of the first groove and the bottom side of the core body, and $d_1$ is the depth of the first grooves, and t is the thickness of the core body 101.

$$1\text{ mm} \leq o \leq 5\text{ mm}. \qquad (4)$$

In the present invention, by arranging the second groove close enough to the first groove (1 mm≤o≤5 mm) and properly determining the depth $d_2$ of the second groove in relation to r (1 mm+r≤$d_2$<t), the influence of varying parameter r on the core property may be minimized or even eliminated, so that the sensitivity of the core properties to variations and tolerances may be substantially reduced or even eliminated, while the strength and the stiffness of the infused panel are unexpectedly also be enhanced. Compared to the prior art groove design "flexi-cut", the asymmetric arrangement of grooves 102 and 103 according to the present invention may increase the stiffness by ca. 20% at same infusion resin content. Compared to the prior art groove designs, the asymmetric arrangement of grooves 102 and 103 according to the present invention may increase the strength by ca. 40%. The asymmetric arrangement according to the present invention ensures a reduced variance in obtained stiffness properties because the stiffness of sensitivity to manufacturing and tolerances is reduced. The asymmetric arrangement according to the present invention ensures a reduced variance in stiffness properties when core thickness is varied as compared to the prior art groove designs.

Figure 3A:
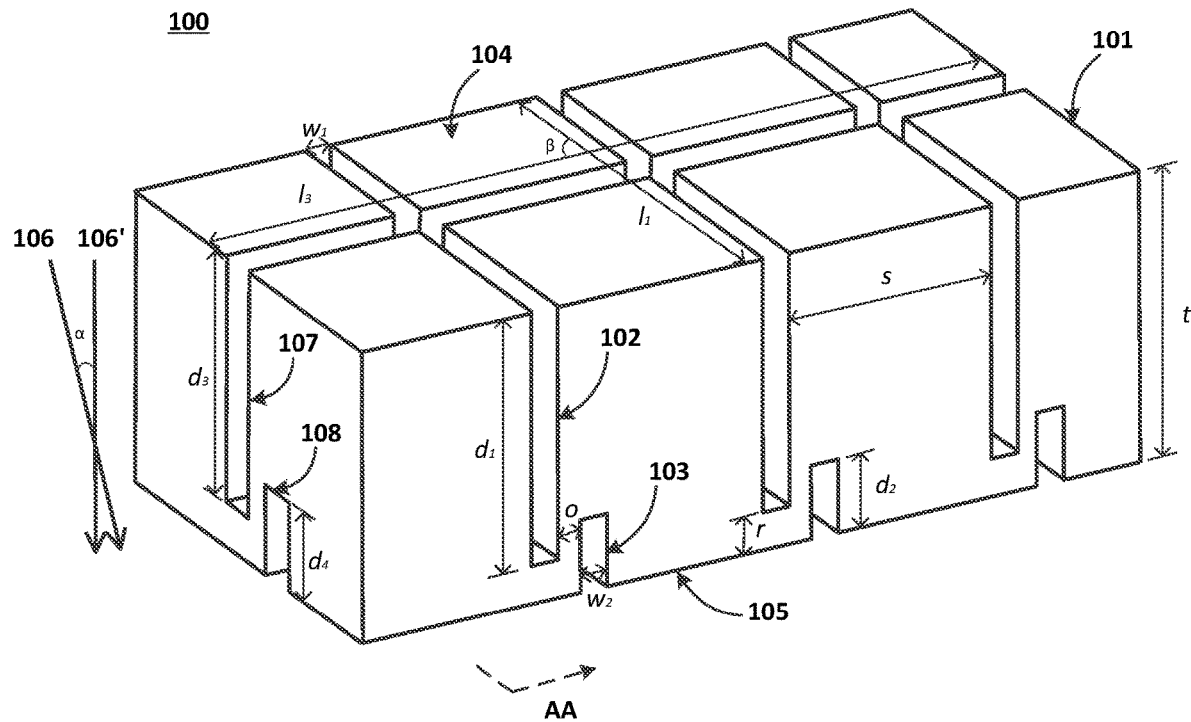
FIGS. 3A-3B illustrate a perspective view and a sectional view of a second exemplary embodiment of the material core according to the present invention.
Figure 3B:
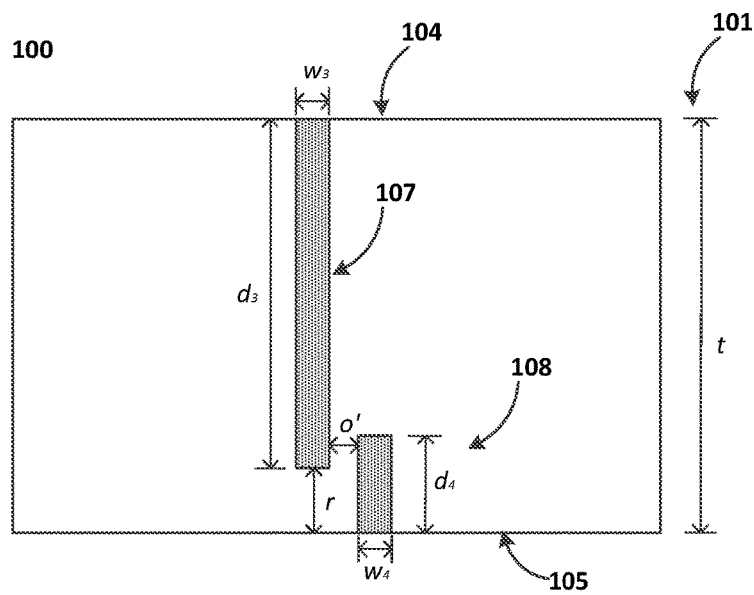

FIGS. 3A-3B illustrate a perspective view and a sectional view (along direction AA) of a second exemplary embodiment of the material core according to the present invention.

The difference between the first and second embodiments lies mainly in that, in the second embodiment, a third groove 107 and a fourth groove 108 are disposed in the core body 101.

The third groove 107 extends from the first side 104, in a second direction 106' at a first angle α to the first direction 106, into depth d3 in the core body 101, wherein the third groove 107 is at a second angle β to the first groove 102. In this embodiment, the first angle α is 0°, and the second angle is 90°. In other embodiments, the third groove 107 may extend in a second direction 106' at a non-zero first angle α to the first direction and the third groove 107 may be at an oblique angle to the first groove 102. Furthermore, in this embodiment, only one third groove 107 is disposed in the core body 101, but in other embodiments, other numbers (for example two, three, five, or ten) of third groove 107 may be disposed in the core body 101. The third groove 107 has a length $l_3$ (not shown) and a width $w_3$, which may be the same as or different from that of the first groove 102.

In this embodiment, the fourth groove 108 extends from the second side, in a direction opposite to the first direction 106, into depth $d_4$ in the core body 101, wherein the fourth groove 108 is parallel to the third groove 107, wherein a distance between the third and fourth grooves 107 and 108 is o'. The fourth groove 108 has a length $l_4$ (not shown) and a width $w_4$, which may be the same as or different from that of the second groove 103.

The depth $d_3$ of the third groove 107 may be the same as or different from the depth $d_1$ of the first groove 102. The depth $d_4$ of the fourth groove 108 may be the same as or different from the depth $d_2$ of the second groove 103. And, the distance o' between the third and fourth grooves 107 and 108 may be same or different from the distance o between the first and second grooves 102 and 103. In any case, the depth $d_3$ and $d_4$ of the third and fourth grooves 107 and 108 and the distance o' between the third and fourth grooves 107 and 108 preferably satisfy the formula (1) to (4).

By disposing the third and fourth grooves 107 and 108, the drapability of the material core 100 may be further improved by improving the drapability of the material core in another direction, in this embodiment, in the crosswise direction of the material core 100 (the arrangement of the first and second grooves 102 and 103 enhance the drapability of the material core 100 in the lengthwise direction).

Figure 4:
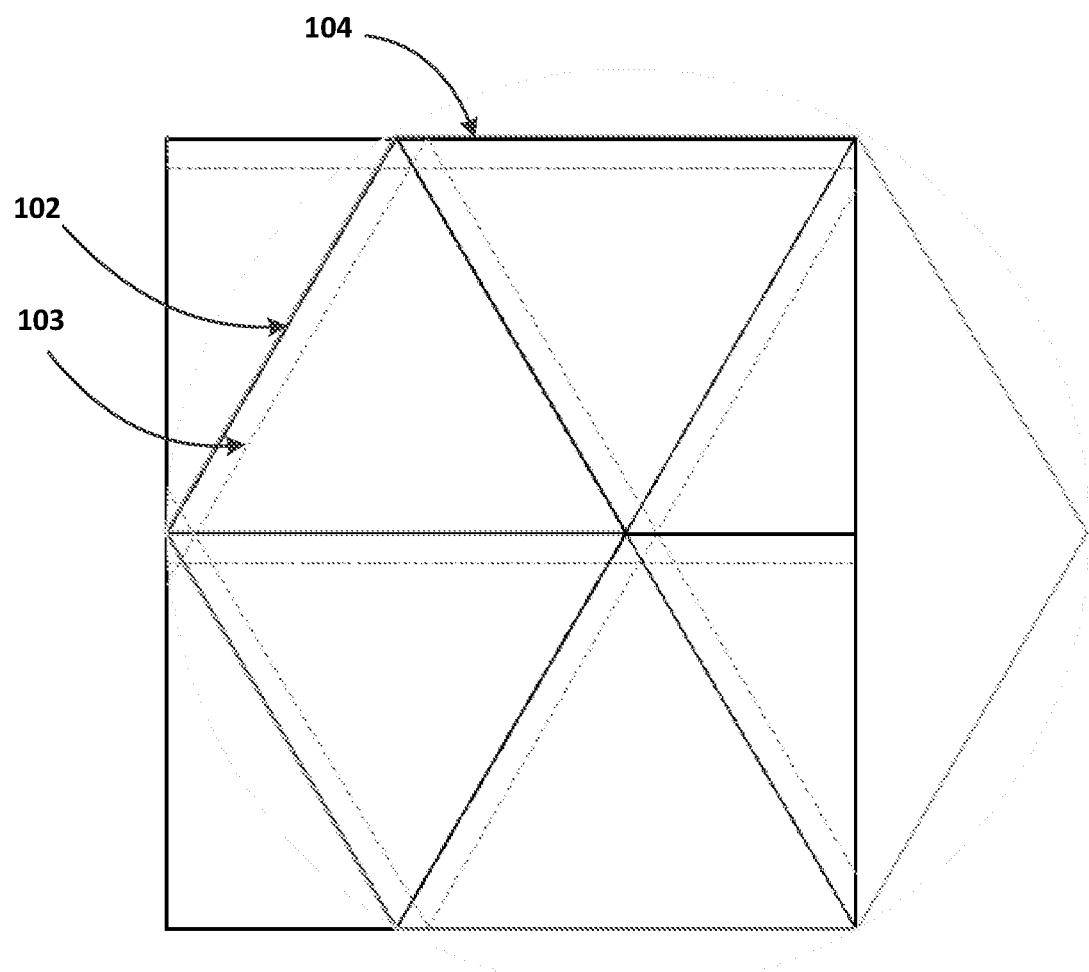
FIGS. 4-5 illustrate top views of the material cores having exemplary groove patterns according to the present invention.
Figure 5:
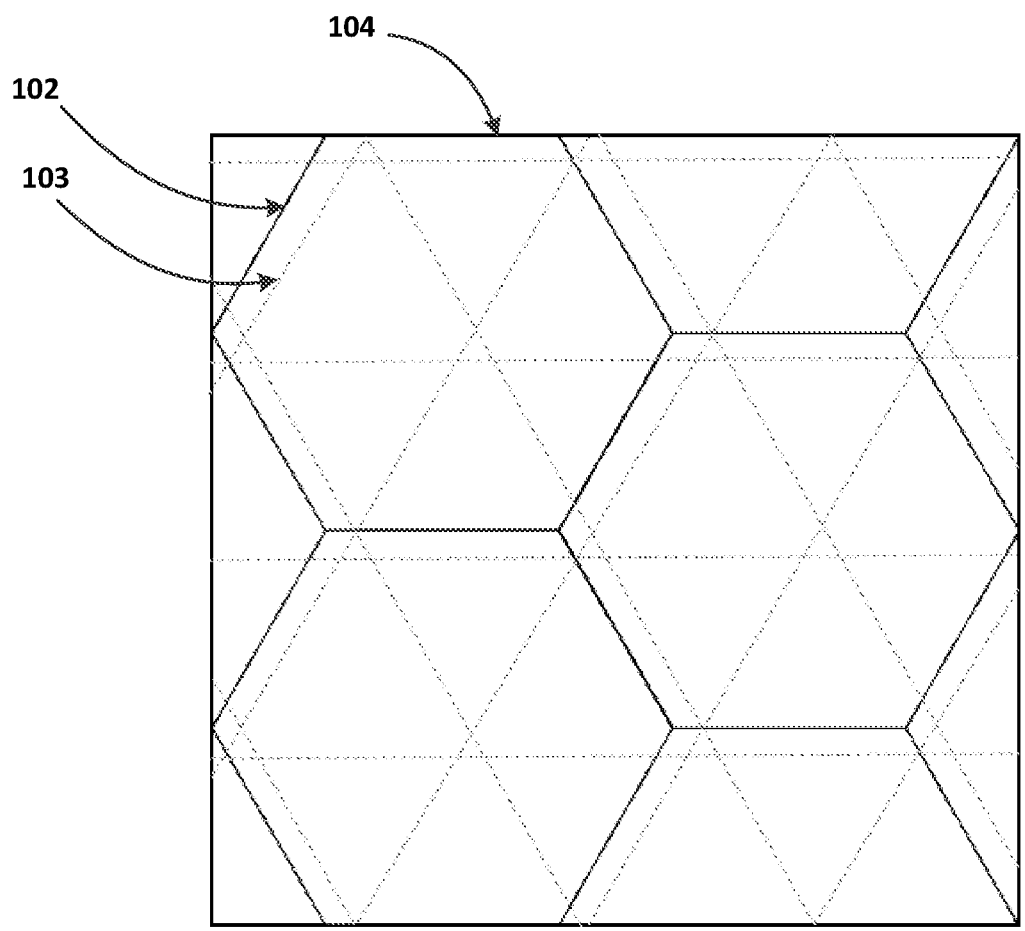

FIGS. 4-5 illustrate top views of the material cores having exemplary triangular and hexagonal groove patterns according to the present invention. In FIGS. 4 and 5, the patterns are shown to be on the top face 104 of the core body, but in other embodiments, the patterns may be formed on the other faces of the core body, such as bottom face or lateral face. In FIGS. 4 and 5, the first grooves 102 are shown as solid line and the second grooves 103 are shown as dash line.

In FIG. 4, a pattern of triangles are shown, wherein each triangle is formed by multiple pairs of the first and second grooves 102 and 103. In this embodiment, the triangles are equilateral, but in other embodiments, other triangles, such as right triangles may be formed. Using the pattern of grooves having specific shapes, a desired drapability may obtained for a specific curved mold surface.

In FIG. 5, a pattern of hexagons are shown, wherein each hexagon is formed by multiple pairs of the first and second grooves 102 and 103. In this embodiment, the hexagons are regular hexagons, but in other embodiments, other hexagons may be formed. Using the pattern of grooves having specific shapes, a desired drapability may obtained for a specific curved mold surface.

Figure 6:
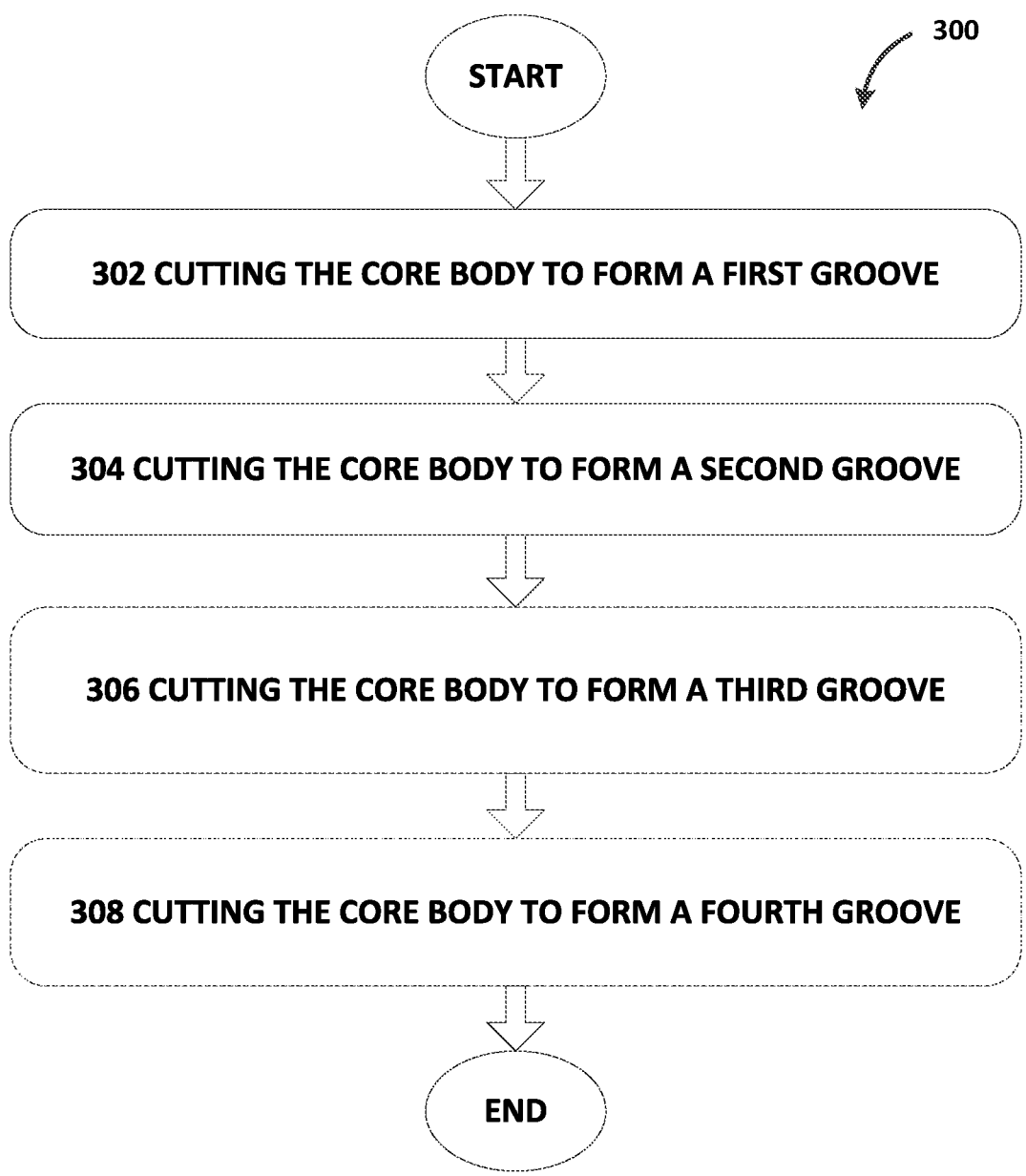
FIG. 6 illustrates a flowchart of the method for manufacturing the material core according to the present invention.

FIG. 6 illustrates a flowchart of the method for manufacturing the material core according to the present invention. The steps shown in dash line blocks are optional steps.

The method 300 starts at step 302, in which a core body of the material core is cut, for example using a round saw, to form a first groove which extends from a first side of the core body, in a first direction, into a depth $d_1$ in the core body. To form the first groove, various cutting method may be used, such as laser cutting, mechanical cutting, heat cutting and etc. It may also be understood that the cutting may be performed in various directions and ways so long as the manufactured core has the desired grooves. For example, the cutting may be performed on the top or bottom side in a vertical direction, or the cutting may be performed on the lateral side in a horizontal direction. In both cases, the same structure of the first grooves may be formed.

At step 304, the core body is cut, for example using a round saw, to form a second groove which extends from a second side of the core body facing away from the first side, in a direction opposite to the first direction, into a depth $d_2$ in the core body, wherein the second groove is parallel to the first groove and wherein the depth $d_1$ and $d_2$ of the first and second grooves and the distance o between the first and second satisfy the formula (1) to (4). To form the second groove, various cutting method may be used, such as laser cutting, mechanical cutting, heat cutting and etc. It may also be understood that the cutting may be performed in various directions and ways so long as the manufactured core has the desired grooves. For example, the cutting may be performed on the top or bottom side in a vertical direction, or the cutting may be performed on the lateral side in a horizontal direction. In both cases, the same structure of the second grooves may be formed.

At optional step 306, the core body is cut to form a third groove extending from the first side, in the first direction, into depth $d_3$ in the core body, wherein the third groove is perpendicular to the first groove. The cutting method for the first groove may be same as or different from that for the first and second grooves.

At optional step 308, the core body is cut to form a fourth groove extending from the second side, in a direction opposite to the first direction, into depth $d_4$ in the core body, wherein the second groove is parallel to the third groove, wherein a distance between the third and fourth grooves is o', wherein the depth $d_3$ and $d_4$ of the third and fourth grooves 107 and 108 and the distance o' between the third and fourth grooves 107 and 108 preferably satisfy the formula (1) to (4).

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What we claim is:

1. A material core for a wind turbine blade, comprising:
   a core body;
   a first groove, extending from a first side of the core body, in a first direction, into a depth d1 in the core body; and
   a second groove, extending from a second side of the core body facing away from the first side, in a direction opposite to the first direction, into a depth d2 in the core body, wherein the second groove is parallel to the first groove, and wherein:

$d_2 = t - d_1 + x,$ $1 \text{ mm} \leq c \leq d_1,$ wherein t is a thickness of the core body and a distance between the first and second grooves is o, wherein:

$1 \text{ mm} \leq o \leq 5 \text{ mm}.$

2. The material core of claim 1, wherein the core body comprises a plurality of the first grooves and a plurality of the second grooves, and the distance o between each adjacent first and second groove is smaller than a distance between each adjacent first groove.

3. The material core of claim 1, wherein the core body further comprises:
   a third groove, extending from the first side, in a second direction at a first angle to the first direction, into the depth d1 in the core body, wherein the third groove is at a second angle relative to the first groove; and
   a fourth groove, extending from the second side, in a direction opposite to the second direction, into the depth d2 in the core body, wherein the fourth groove is parallel to the third groove, and a distance between the third and fourth grooves is o.

4. The material core of claim 3, wherein the first angle is 0° and the second angle is 90°.

5. The material core of claim 3, wherein the core body comprises a plurality of the third grooves and a plurality of the fourth grooves, and the distance o between each adjacent third and fourth groove is smaller than a distance between each adjacent third groove.

6. The material core of claim 1, wherein the material core further comprises a plurality of pairs of the first and second grooves, and the plurality of pairs of the first and second grooves form a pattern on one or more sides of the core body.

7. The material core of claim 6, wherein the pattern comprises one or more rectangles, squares, triangles or hexagons.

8. The material core of claim 1, wherein the first groove and/or the second groove has a width which is able to guide resin flow.

9. The material core of claim 1, wherein the core body has a shape of cuboid.

10. The material core of claim 1, wherein the core body is made from a material selected from the group consisting of:
    Balsa wood, *Paulownia* wood, polyethylene terephthalate (PET) foam, Polyvinyl Chloride (PVC) foam, Styrene acrylonitrile (SAN) foam, Polymethacrylimide (PMI) foam, Polyetherimide (PEI) foam, Polystyrene (PS) foam and Polyurethane (PU) foam.

11. A sandwich panel for a wind turbine blade, the sandwich panel comprising:
    a first laminate and a second laminate; and
    the material core of claim 1, disposed between the first and second laminates.

12. The sandwich panel of claim 11, wherein the first and/or second laminates comprise glass or carbon fiber reinforced polymer.

13. A wind turbine blade, comprising the sandwich panel of claim 11.

14. A wind turbine, comprising the wind turbine blade of claim 13.

15. A method for manufacturing a material core for a wind turbine blade, the method comprising
    cutting a core body of the material core to form a first groove which extends from a first side of the core body, in a first direction, into a depth d1 in the core body; and
    cutting the core body to form a second groove which extends from a second side of the core body facing away from the first side, in a direction opposite to the first direction, into a depth d2 in the core body, wherein the second groove is parallel to the first groove, and wherein:

$d_2 = t - d_1 + x,$ $1 \text{ mm} \leq c \leq d_1,$ wherein t is a thickness of the core body and a distance between the first and second grooves is o, wherein:

$1 \text{ mm} \leq o \leq 5 \text{ mm}.$

16. The method of claim 15, further comprising:
    cutting the core body to form a third groove extending from the first side, in the first direction, into the depth d1 in the core body, wherein the third groove is perpendicular to the first groove; and
    cutting the core body to form a fourth groove extending from the second side, in the direction opposite to the first direction, into the depth d2 in the core body, wherein the second groove is parallel to the third groove, and a distance between the third and fourth grooves is 0.

\* \* \* \* \*